Oct. 27, 1970    R. A. RAVENEL    3,536,363

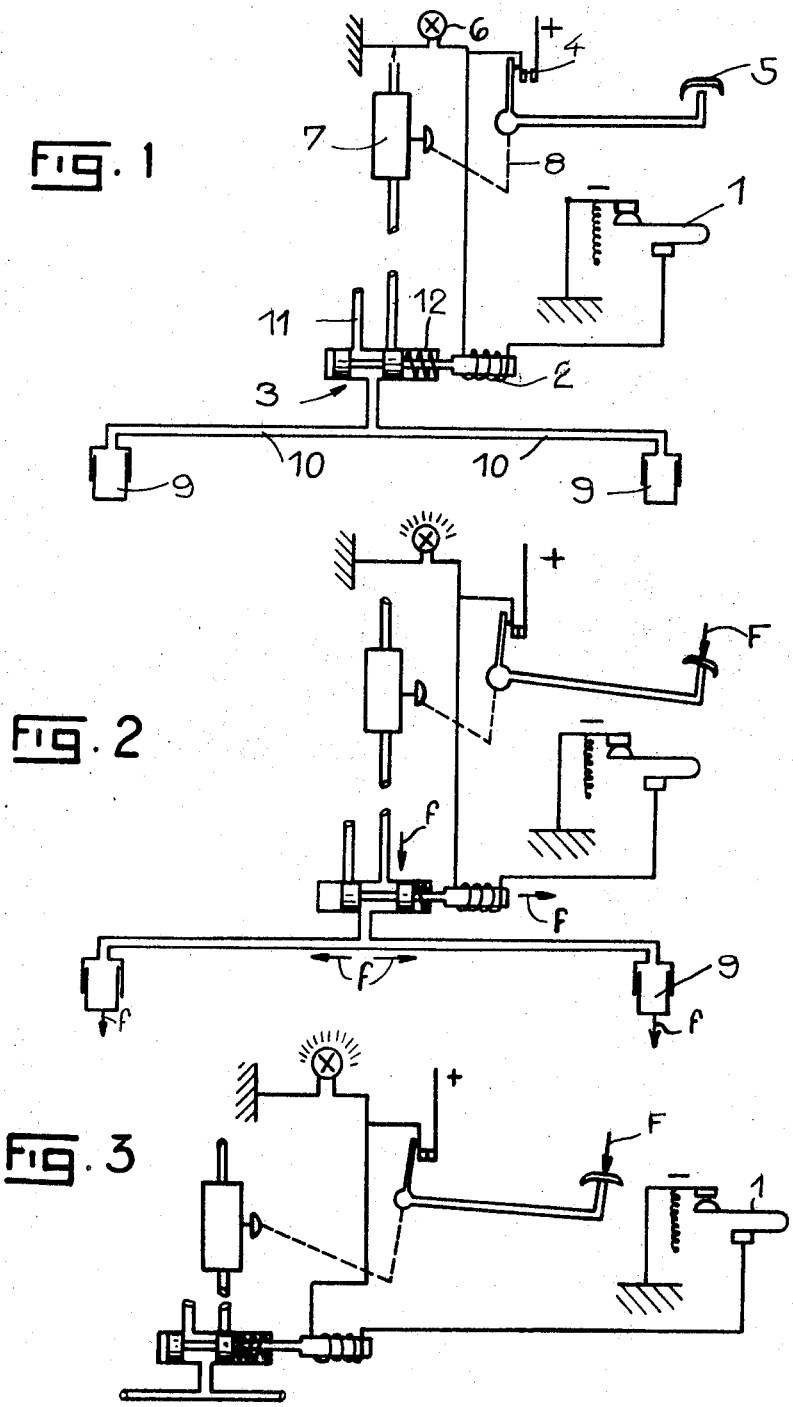

VEHICLE BRAKING SYSTEMS

Filed Oct. 18, 1968    2 Sheets-Sheet 2

3,536,363
VEHICLE BRAKING SYSTEMS
Raymond A. Ravenel, Sceaux, France, assignor to Societe Anonyme Andre Citroen, Paris, France, a French society
Filed Oct. 18, 1968, Ser. No. 768,779
Claims priority, application France, Oct. 19, 1967, 125,053
Int. Cl. B60t 8/12, 17/22
U.S. Cl. 303—21                4 Claims

ABSTRACT OF THE DISCLOSURE

This invention relates to vehicle braking systems and is particularly concerned with a safety device therefor, of the kind that comprises an electromagnetically-operable valve that can be arranged on a feed pipe associated with one or more brake cylinders of the braking system, this valve being controllable by a detector that is sensitive to the deceleration of a wheel. The improvement, according to the invention, consists in that an energising coil for the valve can be connected to the positive pole of the vehicle battery and to earth by means of a normally closed contact on the detector and the valve, in its non-energised state, is operable to place the brake cylinder or cylinders in communication with a braking fluid tank by means of a calibrated return spring.

---

French Pat. No. 1,176,774 in the name of Societe Anonyme Andre Citroen discloses a safety device for use in vehicle braking systems which satisfactorily checks the braking and practically prevents any locking of the wheels.

This device is based upon the observation that the period of locking of a braked wheel is very short and corresponds to an angular deceleration of this wheel greater than that which results from the most rapid slowing down which may be imposed on a vehicle on very good ground. Such a device comprises, in combination with a braking mechanism, a detector sensitive to the deceleration of the wheel and means controlled by the detector for disconnecting the brake when the deceleration reaches a value higher than the maximum stable value without sliding.

In the embodiment which was described more particularly in the above mentioned patent and provided for a hydraulic braking installation, the device comprised an electromagnetically-operated valve capable of placing the braking cylinder, in non-energised position, in communication with the braking fluid distributor, whilst the energisation coil of this valve is energised by means of a contact of a detector, in open position as long as the wheel of the vehicle undergoes a deceleration lower than a certain threshold.

This device does not act on the operation of the brake as long as the slowing down of the vehicle remains compatible with the adherence to the ground and presents a considerable response delay which may sometimes permit the wheel to commence sliding before effectively coming into action. In addition, when this device ceases, its action of braking re-establishment may sometimes be violent.

The present invention has for an object to avoid or minimise these disadvantages and to produce a device having a lesser response inertia, thus reducing the risk of a transitory beginning of a slide and having on the other hand a certain inertia during the re-establishment of the braking.

To this end, the invention comprises safety device for use in a vehicle braking system in which an electromagnetically-operable valve, located on a pipe feeding fluid under pressure to the brake cylinders, is controlled by a detector sensitive to the deceleration of a wheel, and wherein said valve has an energising coil arranged for connection on the one hand to the positive pole of the battery of the vehicle, and, on the other hand, to earth by means of a normally closed contact of said detector, and wherein said valve, in the non-energised state, places the brake cylinder or cylinders in communication with the braking fluid tank by means of a return spring.

Figure 4:
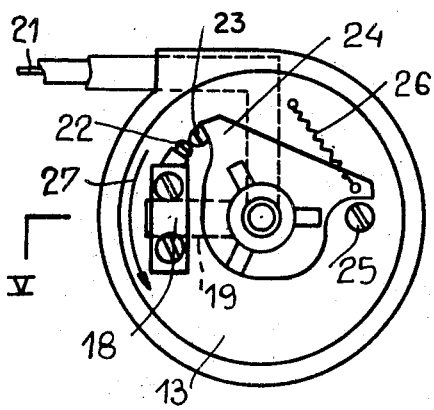
Figure 5:
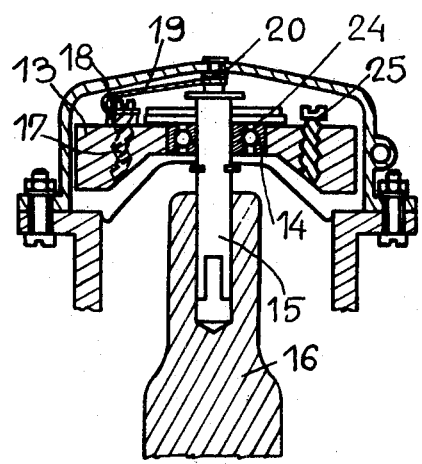
Figure 6:
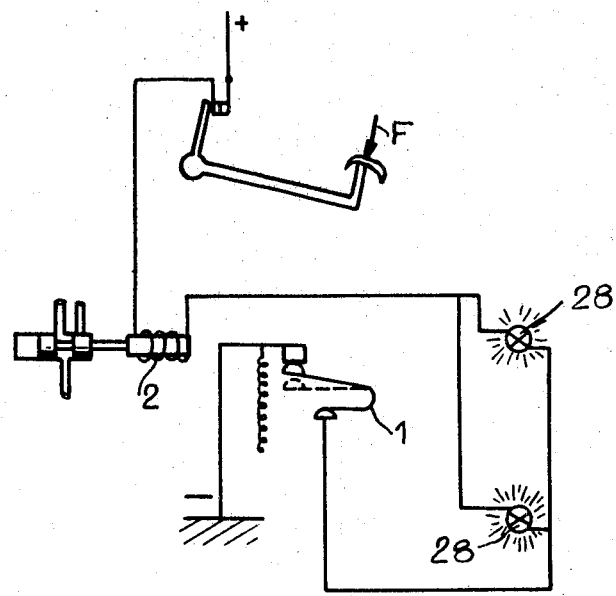

Other characteristics and advantages of the invention will appear from the following description of embodiments of the above device, said description being given solely by way of example and with reference to the accompanying drawing, in which:

FIG. 1 schematically shows an embodiment of the device according to the invention applied to a hydraulic braking installation, FIGS. 2 and 3 show two states of the device of FIG. 1 during braking, without sliding and with sliding of the wheel respectively, FIG. 4 shows an elevation view of a detector according to the invention, FIG. 5 shows a view in section along the line V—V of the detector of FIG. 4, and FIG. 6 shows a modification of the device of FIG. 1.

Referring now to the drawing, the device shown in FIG. 1 comprises an inertia contact 1 or deceleration detector which is normally closed and located in the circuit of an energisation coil 2 of an electromagnetically-operated valve 3.

The circuit of the coil 2 also comprises a movable contact 4 which is normally open and which can be closed by the operation of a brake pedal 5, an indicator lamp 6 being in addition connected in parallel with the coil 2 and the contact 1 of the detector.

The braking circuit comprises a brake control member 7 controlled by the brake pedal 5 by means of a transmission shown symbolically at 8 and connected to the valve 3 which, in the position shown in this FIG. 1 and corresponding to the non-use of the brakes, is not energised. In this state, the brake control member 7 is isolated from the brakes and the cylinders 9 of these latter are in communication by means of a pipe 10 connected to the valve 3 and by means of another pipe 11 with the usual tank (not shown) of braking fluid.

Finally, the valve 3 is held in this position by a calibrated return spring 12.

FIG. 2 shows the state of the device of FIG. 1 when a force F is exerted on the brake pedal 5 and when there is no sliding of the wheel of the vehicle provided with the contact detector 1.

The movable contact 4 is then closed as well as the contact 1 of the detector.

The valve 3 is energised and the brake control member 7 is in communication with the brake cylinders 9 (arrows $f$ indicating the direction of the movements of the movable members or the fluid outputs).

In addition, the lamp 6 is illuminated, indicating operation of the brakes.

If a sliding of the wheel occurs (FIG. 3), the contact 1 opens and the de-energised valve 3 returns under the action of the return spring 12 to the initial state (FIG. 1) in which the brake cylinders 9 are in communication with the braking fluid tanks.

This state of non-energisation of the valve 3 is very brief since the wheel of the vehicle is then immediately unlocked, this causing the contact 1 of the detector to close and to return to the state shown in FIG. 2. A new sliding may occur and brings about a new de-energisation-re-energisation cycle of the valve 3.

FIGS. 4 and 5 show embodiment of the contact detector 1. This latter comprises a fly wheel 13 mounted by means of a ball bearing 14 on a stud 15 securely connected to the axle 16 of the wheel.

A contact holder 18 connected by a flexible blade 19 to a contact 20, itself connected to a conductor 21, is fixed by means of screws 17 to this fly wheel 13.

The contact holder 18 comprises one of the contacts 22 of the contact 1 of the detector, the other contact 23 being held by a member 24 connected to rotate with the stud 15. The fly wheel 13 has in addition a stop 25 which may come into contact with the member 24 and normally closing the contacts 22 and 23.

The direction of rotation of the fly wheel 13 and of the member 24 is that indicated by the arrow 27.

In the absence of sliding of the wheel, the contacts 22 and 23 touch one another. When the deceleration of the wheel with which the member 24 is securely connected exceeds the predetermined threshold the inertia of the fly wheel 13 causes the contacts 22 and 23 to open. The electrical circuit of the detector is thus opened immediately independently of the time necessary for the travel of the fly wheel 13 to be covered until the stop 25 touches the member 24.

The device described in the French patent hereinabove referred to had the disadvantage of having a considerable response time due to the fact that it was necessary to wait until one of the contacts of the detector had covered a certain travel (necessitated by questions of isolation) before touching the other contact and of then controlling the energisation of the valve.

Moreover, a delay of a similar kind occurs when the wheel stops sliding and when the contacts 22 and 23 touch one another again.

Thus in return, too violent a re-establishment of the braking pressure in the brake cylinders is avoided, this on the contrary risking being produced in the device or the prior patent referred to.

The wheel of the vehicle therefore has the time to return to an angular speed which is close to that of the car without sliding.

In the embodiment shown in FIG. 6, the lamps 28 of the rear stop lights of the vehicle are introduced in the circuit of the coil 2 of the valve 3.

In the closed position (shown in solid lines) of the contact 1 of the detector, that is to say, in the absence of any sliding of the wheel of the vehicle during braking, the stop lights 28 light up, indicating, as usual, that the car is being braked. If the wheel begins to slide, the contact 1 opens (as shown in dashed lines) the valve 3 is de-energised and the lights 28 are extinguished.

This state is very brief, as was stated above, and the contact 1 returns very rapidly to its closed state, this causing the lights 28 to be illuminated again.

Consequently, this device, upon braking at the limits of adherence, presents the advantage of bringing about a rapid winking of the stop lights of the vehicle and may thus give a warning to a following driver.

This modification also permits an easy vertification of the operation of the detector by the illumination of the stop lights and their extinction during jerks exerted on the wheel when rotating (raised on a jack). Similarly, the elimination of the braking when the two lamps of the stop lights 28 are simultaneously eliminated and its reappearance when they are placed in position takes into account the good operation of the valve without any dismantling.

The circuit of the coil 2, the valve 3 and the contact 1 of the detector may also be connected in parallel with the stop lights 28.

It will be understood that the present invention is not limited to the embodiments described and shown hereinabove. Therefore, a device as described above may be associated with each brake cylinder.

I claim:

1. In a fluid system for controlling braking of a vehicle wheel and having an electrical circuit including a power source, a master cylinder, a fluid reservoir and brake cylinder, the improvement which comprises:

an electromagnetically-operable valve adapted alternatively to establish communication between said brake cylinder and said master cylinder or said brake cylinder and said reservoir;

deceleration sensitive detector means connected to said vehicle wheel;

an electrical contact associated with said detector means said contact being normally closed electrically to connect said power source and said electromagnetically-operable valve to maintain communication between said master cylinder and said brake cylinder and being operable by a predetermined inertial force to open position, thus to deenergize said electromagnetically-operable valve; and biasing means urging said valve to a position to establish communication between said reservoir and said brake cylinder.

2. The braking system according to claim 1 wherein said electrical contact associated with said detector means is biased to a closed position.

3. The braking system according to claim 1 wherein said circuit includes normally open switch means operable by a brake control mechanism to closed position.

4. The braking system according to claim 1 wherein the power supply circuit of said valve is in series with the power supply circuit of the stop lights of said vehicle.

References Cited

UNITED STATES PATENTS

| 3,089,734 | 5/1963 | Jankus | 303—61 X |
| 3,153,559 | 10/1964 | Schaffer | 303—21 |
| 3,232,676 | 2/1966 | Cripe | 303—21 |
| 3,425,751 | 2/1969 | Wehde et al. | 303—21 |

MILTON BUCHLER, Primary Examiner

J. J. McLAUGHLIN, Jr., Assistant Examiner

U.S. Cl. X.R.

188—181; 303—6, 61, 68